Patented Dec. 19, 1950

2,534,297

UNITED STATES PATENT OFFICE 2,534,297

RESIN ACID NITRILES

Stearns T. Putnam, Roselle, Del., assignor to Hercules Powder Company, Wilmington, Del., a corporation of Delaware No Drawing. Application October 8, 1949,
Serial No. 120,424

7 Claims. (Cl. 260—100)

This invention relates to a process for the preparation of stabilized rosin nitriles and to the novel stabilized rosin nitriles produced thereby.

Rosin nitrile, the major component of which is abietonitrile, has been prepared heretofore by heating a natural rosin or natural rosin acids with gaseous ammonia in the presence of a dehydrating catalyst such as silica gel. In U. S. 2,023,337 to Nicodemus there is disclosed the reaction of rosin in the liquid phase with ammonia gas at a temperature of about 350° C. in the presence of silica gel as a dehydration catalyst so as to form abietonitrile. It is well known that fatty acids may be converted to the nitriles by reaction with ammonia at elevated temperature not only in the presence of a catalyst but also in its absence. However, Jolly in U. S. 2,380,531 distinguishes tall oil, which is a mixture of resin acids and fatty acids, from fatty acids in the prior art processes for conversion of fatty acids to fatty acid nitriles, in that for best results tall oil must be treated with ammonia at elevated temperatures under such conditions that the time of contact is relatively short and a catalyst is used. The preferred method of Jolly is substantially that of Nicodemus. In U. S. 2,461,549 Ralston et al. disclose that abietic acid alone may be converted into the nitrile following the disclosed procedure of reacting tall oil in liquid phase with ammonia at a temperature of from 600 to 750° F. The examples of the Ralston patent show the use of a catalyst for the liquid phase reaction and suggest further the reaction in vapor form with ammonia by passing the reactants over a dehydrating catalyst at temperatures from 750 to 800° F.

In these prior art processes using natural rosin or abietic acid as a reagent, unfortunately dimerization, polymerization, and decarboxylation of the resin acids take place in competition with the main reaction as a result of the catalytic action of the dehydrating catalysts used. In an effort to overcome these disadvantages by leaving out the catalyst, one reduces not only the side reactions but also, and to about the same degree, the main reaction, so that in either case the resulting rosin nitrile or abietonitrile is admixed with by-products, which greatly lower the yield, and from which the nitrile is removed only with difficulty. The volatile portion of the product produced from natural rosin in the presence or absence of a catalyst is thus a mixture of abietonitrile and rosin oils.

Now in accordance with the present invention, it has been found that stabilized rosin nitriles having novel and highly valuable characteristics may be prepared by a process of heating hydrogenated or dehydrogenated rosin in the liquid phase with gaseous ammonia in the absence of a catalyst while continuously removing the water formed in the reaction from the reaction mixture without encountering the above-mentioned disadvantages attendant upon the prior art processes for preparing the only heretofore known rosin nitrile from natural rosin. The novel stabilized rosin nitriles produced by the present process are distinguished from abietonitrile in their unique properties as a plasticizer for vinyl polymers and in having the unexpected property of being capable of introduction into the vinyl polymers prior to polymerization without requiring an increased amount of catalyst or an increased polymerization time and without deleteriously affecting the plasticized vinyl polymer.

Although abietonitrile of the prior art shows plasticizing action for such vinyl polymers as polystyrene, polyvinyl chloride, polyvinyl acetate-chloride, and butadiene polymers and copolymers, it has found no use in such application for several reasons. Such commercially significant polymers are all difficultly millable. Consequently, incorporation of abietonitrile into the polymers by milling is quite difficult and in some cases, e. g., that of polystyrene, impossible. Moreover, abietonitrile tends to cause discoloration under the necessary milling conditions at elevated temperatures thereby limiting its usefulness. The hydrogenated and dehydrogenated rosin nitriles of this invention, on the other hand, can be incorporated into these polymers by effecting polymerization of the monomers in solution with the plasticizer, thereby providing the plasticizing effect without impairing the polymerization reaction in any way. Abietonitrile cannot be incorporated with the monomers in this manner because it severely inhibits the polymerization reaction. This characteristic difference between the nitriles of this invention and abietonitrile is of definite commercial significance.

The process of this invention in being carried out with stabilized rosins and in being carried out in the absence of a catalyst results in a higher yield of nitrile and a purer and more useful product than when the prior art catalytic process is applied to the stabilized rosins or when the present noncatalytic process is applied to ordinary rosin or rosin acids. By removing water as fast as it is formed in the reaction, the reaction goes to completion at a sufficiently rapid rate without the use of a catalyst to avoid the deleterious effects of heating, and the product is obtained in better yield and in purer form than in a process involving simply substituting a stabilized rosin for natural rosin in the prior art process of Nicodemus.

The following examples are illustrative of the new nitriles and the process of preparing them in accordance with the present invention. All parts given in the examples represent parts by weight.

*Example I*

In this and the following examples the apparatus used consisted of a reaction vessel outfitted with a sparge tube through which the anhydrous ammonia was introduced into the reaction mixture, a thermometer well for measuring the pot temperature, and a vertical column provided with an electrically heated sleeve, the top of the column being connected to a water-cooled condenser to condense the gases vaporized during the reaction.

Three thousand parts of a hydrogenated rosin having an acid number of 167.5 and a bromine number of 92 and containing less than about 1% abietic acid was placed in the reaction vessel and melted. The vertical column was heated to and held at about 210° C. during the reaction. Anhydrous ammonia was then introduced into the molten rosin through the sparge tube and adjusted to a flow rate of 86 parts by weight per hour. The temperature was raised to 325° C. ±10° C. during 2½ hours and held at that temperature for 16 hours. The reaction mixture was then cooled and sparged with nitrogen at 110°–120° C. for 2 hours. The crude product having an acid number of 3.5 was neutralized by adding a solution of 11.1 parts of potassium hydroxide in 50 parts of ethanol to the stirred mixture at about 100° C. The alcohol was removed by distilling under vacuum to a pot temperature of 150° C. after which the crude nitrile was distilled under vacuum, the fraction boiling at 163°–218° C. at 0.8 to 1.8 mm. of mercury being collected. The nitrile had a nitrogen content of 4.64% (the nitrogen content of dihydroabietonitrile is 4.90% and that of tetrahydroabietonitrile is 4.88%), an acid number of 0.22 and a bromine number of 86. The yield of product obtained was 2409 parts which corresponds to a yield of 94.4% of a product containing 94.7% nitrile or a yield of 89.5% of the pure nitrile. The yield in this and the following examples has been based upon the acid content of the stabilized rosin used as a starting material.

*Example II*

Thirty-five hundred parts of a hydrogenated rosin having an acid number of 164 and a bromine number of 94 and containing less than about 1% abietic acid was introduced into the reaction vessel and melted. Ammonia was sparged through the molten rosin for 3 hours at a rate of 86 parts by weight per hour while the temperature was raised to 325°±10° C. The reaction mixture was held at this temperature for 17 hours while the ammonia sparge was continued at a rate of 92 to 53 parts by weight per hour, the vertical column being held at a temperature of 200° C. The crude reaction mixture was sparged with nitrogen while it cooled. The crude nitrile had an acid number of 2.9 and was neutralized by adding a solution of 10.3 parts of potassium hydroxide in 50 parts of ethyl alcohol. After removing the ethyl alcohol by distillation under vacuum, the crude nitrile was distilled. The fraction boiling at 157°–223° C. at 0.7 to 1.8 mm. was collected. This fraction was equal to 2814 parts of the product and had an analysis of 4.54% nitrogen, an acid number of 0.32, and a bromine number of 77. The product which was 92.6% pure corresponds to an 89.4% yield of pure nitrile.

*Example III*

Nine hundred parts of a hydrogenated rosin having an acid number of 167.5 and a bromine number of 92 and containing less than about 1% abietic acid was melted in the reaction vessel and sparged with ammonia at the rate of 53 parts by weight per hour while the temperature was raised to 325° C. during a 2½ hour period. The vertical column was maintained at a temperature of about 350° C. during the reaction. The ammonia sparge was continued at the above rate while the temperature was held at 325°±10° C. for 16 hours. The crude nitrile had an acid number of 2.44 and was neutralized by adding a solution of 2.35 parts of potassium hydroxide in 15 parts of alcohol. The alcohol was removed by distillation and the crude nitrile distilled. The distilled nitrile, 630 parts, boiled at 165°–208° C. at 0.45 to 1.6 mm. of mercury. The viscous sticky light yellow oil had a nitrogen content of 4.84, an acid number of 0.40, and a bromine number of 76. The product had a purity of 98.7% and corresponded to a yield of 81.2% of the pure product.

*Example IV*

A charge of 3940 parts of dehydrogenated rosin having an acid number of 168.5 and containing less than about 1% abietic acid was melted in the reaction vessel. Ammonia was sparged through the molten rosin at a rate of 86 parts by weight per hour while the temperature was raised to 325° C. over a 3-hour period. The ammonia sparge was continued for 36 hours at the same rate, the reaction mixture being held at a temperature of 325°±10° C. The vertical column was held at a temperature of 210° C. during the reaction. The crude product, having an acid number of 3.37, was sparged with nitrogen to remove the excess ammonia and then was neutralized by adding a solution of 17.3 parts of potassium hydroxide in 150 parts of ethanol. The alcohol was removed by distillation under vacuum and the crude nitrile was then distilled, the fraction boiling at 167°–218° C. at 0.75 to 5.0 mm. of mercury was collected. The dehydrogenated rosin nitrile was a viscous yellow oil which had a blue fluorescence. On analysis the product was found to contain 4.46% nitrogen (theory for dehydroabietonitrile is 4.98), an acid number of 0.14, and a bromine number of 37. The yield of product obtained was 2860 parts which corresponds to 85.8% of 89.3% dehydrogenated rosin nitrile.

*Example V*

Ammonia was sparged through 900 parts of molten dehydrogenated rosin containing less than about 1% abietic acid and having an acid number of 162.3 at a rate of 53 parts by weight per hour while the reaction temperature was raised to 325° C. over a period of 3½ hours. The ammonia sparge was continued at a rate of 43 to 53 parts by weight per hour for 14½ hours, the temperature being held at 325°±10° C. The vertical column was held at a temperature of 355° C. The crude product which had an acid number of 10.0 was neutralized by adding 5.3 parts of sodium hydroxide in 100 parts of ethanol. The alcohol was removed by distillation under water-pump vacuum to a pot temperature of 180° C. The crude product was then dissolved in 2500 parts of petroleum ether mixed with 300 parts of ethanol and 200 parts of water. The aqueous alcohol layer was separated and the petroleum ether solution was washed 3 times with 300 parts of a solution of 20 parts of sodium hydroxide in 600 parts of ethanol and 400 parts of water and finally the petroleum ether solution was washed with 300 parts of water until the aqueous layer was neutral. The petroleum ether was then distilled off and the crude nitrile was distilled under vacuum to give 651.7 parts of a fraction boiling from 175°–223° C. at 0.8 to 1.4 mm. of mercury. The viscous yellow oil partially crystallized on standing and had a nitrogen content of 4.74% (theory for dehydroabietonitrile is 4.98), an acid number of 0.45, and a bromine number of 42. The yield obtained was 89% of a product which was 95.3% pure nitrile.

*Example VI*

Ammonia was sparged through 3500 parts of a dehydrogenated rosin containing less than about 1% abietic acid and having an acid number of 162.3 at a rate of 86 parts by weight per hour while the temperature of the reaction mixture was raised to 325° C. during 2 hours. The temperature was held at 325°±10° C. for 11 hours while the ammonia sparge was continued at 86 parts by weight per hour. The sparge rate was then reduced to 53 parts by weight per hour and continued for 14 hours. The vertical column was held at 200° C. during the reaction. The crude product having an acid number of 3.3 was neutralized by adding a solution of 11.9 parts of potassium hydroxide in 50 parts of ethanol. The alcohol was removed by distillation under water-pump vacuum to a pot temperature of 150° C. The crude nitrile was then distilled under vacuum and a fraction equal to 2907 parts was collected which had a boiling range of 163°–195° C. at 0.65 to 1.5 mm. of mercury. The product had a nitrogen content of 4.52 (theory=4.98), an acid number of 0.24, and a bromine number of 41. The product was 90.9% pure and was obtained in a yield of 92.7% of the pure nitrile.

The distilled dehydrogenated rosin nitrile was a viscous yellow oil having a marked blue fluorescence. On standing, a crystalline dehydroabietonitrile separated from the product. The crystalline dehydroabietonitrile was purified by recrystallization from ethanol. Colorless crystals of the pure dehydroabietonitrile were obtained which had a melting point of 87°–87.8° C.

*Example VII*

A charge of 1500 parts molten dehydrogenated rosin, acid number about 168, was placed in a glass vessel having a thermometer well for measuring pot temperature, an inlet tube for the addition of gaseous ammonia and a reflux column for carrying off evolved water and excess ammonia. The dehydrogenated rosin was heated to 320°–328° C. and anhydrous ammonia was then bubbled into the molten resin at the rate of approximately 74 parts by weight per hour with vigorous agitation of the reactants until an acid number of the product had been reduced to 5.2. This required 25.5 hours. Water and low-boiling oils amounting to 242 parts distilled off during this period. The crude nitrile so obtained amounted to 1246 parts and contained 4.3% combined nitrogen as determined by the Kjeldahl method. This corresponded to a dehydrogenated rosin nitrile content of 86.3%. The productivity calculated as parts dehydroabietonitrile per part dehydrogenated rosin used was 0.717.

When this example was repeated carrying out the treatment with ammonia in the presence of silica gel, the productivity of dehydrogenated rosin nitrile calculated as dehydroabietonitrile was only 0.607. Although the silica gel catalyst aided in reducing the acid number to a minimum in a shorter time, the product was contaminated with much more rosin oil resulting from decarboxylation and had to be subjected to time-consuming distillation to get a produce containing as much as 86.3% dehydrogenated rosin nitrile.

*Example VIII*

Ammonia gas was sparged through 500 parts hydrogenated rosin (acid number 162, refractive index 1.527) heated at 325°±5° C. at a flow rate of 32 parts by weight ammonia gas per hour for 16 hours. The flow of ammonia gas carried off the water as fast as formed, and by cooling the effluent gases 38 parts water and 128 parts light oils were collected. The crude product amounting to 316 parts was distilled to collect 278 parts volatile and 38 parts nonvolatile. The volatile portion on redistillation was separated into 6% forerun boiling below 158° C. at 5 mm. pressure and 86% hydrogenated rosin nitrile (boiling point varying from 158° C. to 195° C. at about 5 mm. pressure). This redistilled hydrogenated rosin nitrile was shown to contain 4.5% nitrogen.

A sample of this hydrogenated rosin nitrile and a sample of dehydrogenated rosin nitrile boiling at 189° C. to 218° C. at 6 mm. pressure prepared according to the present invention were compared with abietonitrile prepared by the process of Nicodemus as a plasticizer for a butadiene-1,3-styrene copolymer latex. The following formulation was used:

| | Parts |
|---|---|
| Emulsifier | 4.6 |
| Water | 180.0 |
| Styrene | 28.0 |
| Butadiene-1,3 | 72.0 |
| Nitrile as plasticizer | 15.5 |
| Mercaptan modifier | 0.5 |
| Potassium persulfate | 0.3 |

The emulsifier was the sodium salt of dehydrogenated rosin and the mercaptan modifier was a commercial lauryl mercaptan containing chiefly lauryl mercaptan. The components of the above formulation were combined in sealed containers and shaken at 49° C. for 15 hours, and then the latex was analyzed for water-insoluble solids. A blank was also run using the same formulation but omitting the plasticizer. The yield based on the theoretical was 69% for the blank, 11% for the formulation using abietonitrile as the plasticizer, and 59% for the formulation using hydrogenated rosin nitrile of this example as the plasticizer, and 53.1% for the formulation using dehydrogenated rosin nitrile of this invention as the plasticizer. In comparison to the blank, the lowered yields in the runs using hydrogenated and dehydrogenated rosin nitriles as plasticizers were no greater than that due to the dilution effect of the plasticizers on the emulsions.

Any stabilized rosin may be used for carrying out the reaction in accordance with this invention to obtain the novel stabilized rosin nitriles of this invention. The dehydrogenated rosin is obtained by the dehydrogenation or disproportionation of natural rosin or a rosin material containing a substantial amount of a natural rosin such as gum or wood rosin. If desired, the rosin may be purified prior to its dehydrogenation or disproportionation by any desired means such as crystallization, by means of a selective solvent such as furfural or phenol, or by an absorbent earth. The dehydrogenation or disproportionation reaction is carried out by contacting the rosin or rosin material at an elevated temperature with an active hydrogenation catalyst in the absence of added hydrogen to effect a dehydrogenation or disproportionation reaction. Catalysts such as palladium, platinum, nickel, copper chromite, etc., are suitable. The catalysts may be supported on a carrier such as granular alumina, fibrous asbestos, or activated charcoal. Dehydrogenation or disproportionation with a palladium catalyst, for example, may be conducted either by a batchwise or continuous procedure. Thus, the rosin may be agitated with about 5 to about 20% by weight of a palladium catalyst supported on activated carbon (1–2% palladium) at about 150° C. to about 300° C. for about 1 to about 5 hours. In the continuous process the molten rosin flows over the supported palladium catalyst at a temperature within the range of about 225° C. to about 300° C. to provide a contact time of about ¼ hour to about 1 hour.

Hydrogenated rosins may be obtained by reducing the unsaturation of any natural rosin or rosin material, such as gum or wood rosin, etc. The hydrogenation of rosin or rosin acids may be carried out by contacting the rosin or rosin acid in a fluid state with hydrogen in the presence of an active base metal hydrogenation catalyst, such as activated nickel, Raney nickel, copper chromite, cobalt, etc., under pressure, for example, a hydrogen pressure of 200 to 15,000 pounds per square inch and at a temperature of about 125° C. to about 225° C. for about 0.5 to about 5 hours. A highly active platinum or platinum oxide catalyst may also be employed, in which case the reaction is usually carried out at room temperature under a relatively low hydrogen pressure and in the presence of an inert reaction medium such as acetic acid. Many other variations of the hydrogenation reaction may be utilized. The rosin may be refined prior to or subsequent to its hydrogenation, by any suitable method, as by distillation, heat-treatment with or without a catalyst, solvent refined as with furfural, phenol, etc., or treated with an absorbent such as fuller's earth or activated carbon, or refined by any other method.

Stabilized rosins may also be obtained by treatment of a natural rosin at elevated temperature with sulfur or iodine and the resulting stabilized rosin may be distilled to obtain the monomeric stabilized rosin fraction which is preferred.

The terms stabilized rosin nitrile, hydrogenated rosin nitrile, and dehydrogenated rosin nitrile are intended to define the nitriles produced from any stabilized, hydrogenated, or dehydrogenated rosin, respectively, by replacement of the carboxyl groups thereof by nitrile groups.

In order to obtain the advantages of this invention to the maximum extent, the stabilized rosin used as a starting material, whether hydrogenated rosin or dehydrogenated rosin, is substantially free of abietic acid. The formation of abietonitrile in the stabilized rosin nitriles is objectionable since it impairs the value of the stabilized rosin nitriles as plasticizers for polymeric materials.

In the conversion of a rosin acid into the corresponding nitrile by reaction with ammonia at temperatures within the range of about 250°–350° C., abietyl compounds, if present in small amounts below about 3%, disappear in the process and are not to be found in the product as abietonitrile. The disappearance is attributed to known side reactions of abietic acid such as polymerization, decarboxylation, or condensation of ammonia with the double bonds of the abietyl compound. The conversion of abietic acid in the stabilized rosin into higher molecular weight products will cause a reduction in yield on distillation of the product. However, the by-products, if left in the stabilized rosin nitrile, do not impair the product from the standpoint of inhibiting the emulsion polymerization process in which they are used as plasticizers.

The reaction in accordance with this invention may be carried out at a temperature of about 250° C. to about 350° C. and preferably is carried out at about 315° C. to about 335° C.

Any convenient form of apparatus may be used in carrying out the process. The apparatus should be designed to facilitate the rapid removal of water as fast as it is formed. The use of the vertical column as described in the foregoing examples is advantageous in that it enables the rapid removal of water without loss of the nitriles. It is usually desirable to maintain this column at a temperature of at least 200° C. (wall temperature) so that the vapor temperature at the top of the column will be at least 100° C. When held at a temperature of 350° C. to 500° C. the yield of product is somewhat lower but the purity of the product is higher.

Any means of contacting the hydrogenated or dehydrogenated rosin or rosin acids, in liquid phase, with ammonia may be used. The rosin material may be dissolved in an inert solvent, if desired. However, the reaction is readily carried out in the absence of a solvent by passing the ammonia directly into the molten rosin. The use of a sparge tube usually provides for sufficient contact between the ammonia and rosin material. The amount of ammonia used in the reaction depends upon the efficiency of the ammonia-rosin contact. In any event, it should be at least the quantity necessary to react completely with the resin acids present. In the above examples, the ammonia sparge rate was adjusted so that roughly every one or two hours sufficient ammonia had passed into the reaction mixture to completely react with the acids present. The ammonia gas evolved may be dried and recirculated to prevent losses. The reaction may be carried out under pressure or under a slight vacuum. However, it is conveniently carried out at atmospheric pressure. The ammonia gas may be diluted with any inert gas such as nitrogen, if desired.

Ammonia is passed into the resin acids in liquid phase until the reaction is essentially complete. Usually, it is convenient to add ammonia until the acid number of the reaction mixture is below 5. However, the reaction may be carried out until the amount of unreacted acid is negligible. Any unreacted acid may be neutralized by adding the theoretical amount of inorganic alkali. Any inorganic alkali such as sodium hydroxide, potassium hydroxide, calcium hydroxide, or a mixture of calcium hydroxide and calcium acetate, etc., may be used for this purpose. A convenient method of performing this step is to add an alcoholic solution of the alkali. Another method of purification is to extract the unreacted acid from the crude product using an aqueous alcoholic solution of alkali for the extraction.

The neutral reaction mixture may then be distilled in vacuo to give an acid-free product. The reaction mixture may be distilled without neutralization, but in this case, if an acid-free product is desired, it is necessary to carry out the distillation with careful fractionation.

The stabilized rosin nitriles, prepared from hydrogenated and dehydrogenated rosin, distil readily in vacuo to give viscous sticky oils that vary in color from water white to light yellow. The nitriles prepared from hydrogenated rosins have boiling points between 155° C.–180° C. at 0.5 mm. of mercury and those from dehydrogenated rosin from 160° C.–185° C. at 0.5 mm. of mercury. The exact boiling point of these nitriles is, of course, dependent upon the hydrogenated or dehydrogenated rosin used as a starting material, as these rosins are made up of a mixture of resin acids.

The nitrile from dehydrogenated rosin partially crystallizes on standing to give dehydroabietonitrile, which can be purified by crystallization from alcohol to give pure dehydroabietonitrile in the form of colorless crystals having a melting point of 87° C.–87.8° C.

The resin acid nitriles prepared in accordance with this invention are valuable as chemical intermediates for the preparation of amines, amides, amidines, etc., and may be used in insecticide formulations and in oil additive formulations and they are particularly useful as rubber softeners and plasticizers for synthetic rubber and vinyl polymers.

This application is a continuation-in-part of copending application, Serial No. 635,772, filed December 18, 1945, now abandoned.

What I claim and desire to protect by Letters Patent is:

1. A stabilized rosin nitrile of the group consisting of dehydrogenated rosin nitrile and hydrogenated rosin nitrile.

2. Dehydrogenated rosin nitrile.

3. Hydrogenated rosin nitrile.

4. The process of preparing a stabilized rosin nitrile which comprises reacting a stabilized rosin of the group consisting of dehydrogenated rosin and hydrogenated rosin in liquid phase with gaseous ammonia in the absence of a dehydration catalyst and continuously removing the water from the reaction as it is formed.

5. The process of preparing a stabilized rosin nitrile which comprises reacting a stabilized rosin of the group consisting of dehydrogenated rosin and hydrogenated rosin in liquid phase at a temperature of about 250° C. to about 350° C. with gaseous ammonia in the absence of a dehydration catalyst and continuously removing the water from the reaction mixture as it is formed.

6. The process of preparing a stabilized rosin nitrile which comprises reacting dehydrogenated rosin in liquid phase at a temperature of about 250° C. to about 350° C. with gaseous ammonia in the absence of a dehydration catalyst and continuously removing the water from the reaction mixture as it is formed.

7. The process of preparing a stabilized rosin nitrile which comprises reacting hydrogenated rosin in liquid phase at a temperature of about 250° C. to about 350° C. with gaseous ammonia in the absence of a dehydration catalyst and continuously removing the water from the reaction mixture as it is formed.

STEARNS T. PUTNAM.

No references cited.

Certificate of Correction

Patent No. 2,534,297                    December 19, 1950

STEARNS T. PUTNAM

It is hereby certified that error appears in the printed specification of the above numbered patent requiring correction as follows:

Column 6, line 18, for the word "produce" read *product*; line 28, for the numeral "128" read *120*;

and that the said Letters Patent should be read as corrected above, so that the same may conform to the record of the case in the Patent Office.

Signed and sealed this 13th day of February, A. D. 1951.

[SEAL]

THOMAS F. MURPHY,
*Assistant Commissioner of Patents.*